(12) United States Patent
Pap et al.

(10) Patent No.: US 8,184,781 B2
(45) Date of Patent: May 22, 2012

(54) METHOD AND SYSTEM FOR COMMUNICATING INFORMATION

(75) Inventors: Steven M. Pap, Medina, OH (US); Eric William Schlueter, Akron, OH (US)

(73) Assignee: SecuReach Systems, LLC, Brunswick, OH (US)

( * ) Notice: Subject to any disclaimer, the term of this patent is extended or adjusted under 35 U.S.C. 154(b) by 1472 days.

(21) Appl. No.: 11/652,864

(22) Filed: Jan. 12, 2007

(65) Prior Publication Data
US 2008/0170673 A1 Jul. 17, 2008

(51) Int. Cl.
*H04M 11/00* (2006.01)
*H04M 1/663* (2006.01)
*G06F 15/16* (2006.01)

(52) U.S. Cl. ........... 379/88.18; 379/88.12; 379/88.2; 379/88.11; 379/88.17; 379/88.25; 379/88.26; 379/88.27; 379/88.28; 379/88.14; 379/88.23; 455/412.2; 455/413; 709/206

(58) Field of Classification Search ........... 379/88.12, 379/88.22, 88.2, 88.11, 88.17, 88.18, 88.25–88.28, 379/88.14, 88.23; 455/412.2, 413; 709/206
See application file for complete search history.

(56) References Cited

U.S. PATENT DOCUMENTS

| | | | | |
|---|---|---|---|---|
| 5,153,905 A * | 10/1992 | Bergeron et al. | ........... | 379/88.23 |
| 5,926,526 A | 7/1999 | Rapaport et al. | | |
| 6,233,318 B1 * | 5/2001 | Picard et al. | ............... | 379/88.17 |
| 6,301,245 B1 * | 10/2001 | Luzeski et al. | ............... | 370/352 |
| 6,614,887 B1 * | 9/2003 | Satapathy et al. | ......... | 379/88.22 |
| 7,034,691 B1 * | 4/2006 | Rapaport et al. | ............. | 340/573.1 |
| 7,209,550 B1 * | 4/2007 | Rapaport et al. | ........... | 379/88.12 |
| 7,903,797 B1 * | 3/2011 | Flammer | ................... | 379/88.23 |
| 7,945,027 B1 * | 5/2011 | Wageman et al. | ........... | 379/88.12 |
| 8,014,499 B2 * | 9/2011 | Sealey et al. | ............... | 379/88.17 |
| 2002/0042846 A1 * | 4/2002 | Bottan et al. | .................. | 709/249 |
| 2002/0098831 A1 * | 7/2002 | Castell et al. | ................. | 455/413 |
| 2003/0131074 A1 * | 7/2003 | Lai et al. | ....................... | 709/219 |
| 2004/0015380 A1 * | 1/2004 | Timmins | ........................... | 705/8 |
| 2006/0116111 A1 * | 6/2006 | Klicpera | ........................ | 455/413 |
| 2006/0129499 A1 | 6/2006 | Combar et al. | | |
| 2006/0140359 A1 * | 6/2006 | Sealey et al. | ............... | 379/88.17 |
| 2006/0212452 A1 * | 9/2006 | Cornacchia | .................... | 707/10 |
| 2006/0230124 A1 | 10/2006 | Belfiore et al. | | |
| 2006/0262916 A1 | 11/2006 | Marascio et al. | | |
| 2006/0265489 A1 | 11/2006 | Moore | | |
| 2007/0121816 A1 * | 5/2007 | Bauchot et al. | ............ | 379/88.12 |
| 2007/0170237 A1 * | 7/2007 | Neff | ................................ | 232/36 |
| 2007/0206738 A1 * | 9/2007 | Patel et al. | .................. | 379/93.24 |
| 2007/0217579 A1 * | 9/2007 | Sobti et al. | ................... | 379/67.1 |
| 2007/0233519 A1 * | 10/2007 | Lorsch | .............................. | 705/3 |
| 2007/0239835 A1 * | 10/2007 | Fujita-Yuhas | ................ | 709/206 |
| 2008/0037736 A1 * | 2/2008 | Rapaport et al. | ........... | 379/88.23 |
| 2008/0300873 A1 * | 12/2008 | Siminoff | ........................ | 704/235 |

(Continued)

*Primary Examiner* — Lisa Hashem
(74) *Attorney, Agent, or Firm* — Curatolo Sidoti Co., LPA; Salvatore A. Sidoti; Juile D. Hawk

(57) ABSTRACT

System and method for communicating information from an information provider to a recipient are provided. One illustrative application for the system and method is in a medical practice. The system and method may be used as an automated patient medical information message retrieval system to communicate certain medical information from the medical provider to patients. The system and method permits a provider of medical information, such as a physician's office, to generate messages containing medical information and to deliver the message to a destination mailbox. The patient is provided with a telephone number, personal voice mailbox number, and a personal voice mailbox PIN, to access and retrieve the medical message from the destination mailbox.

24 Claims, 5 Drawing Sheets

U.S. PATENT DOCUMENTS

| | | | |
|---|---|---|---|
| 2009/0055222 A1* | 2/2009 | Lorsch | 705/3 |
| 2009/0086935 A1* | 4/2009 | Narang et al. | 379/88.11 |
| 2009/0097620 A1* | 4/2009 | Kim et al. | 379/88.17 |
| 2010/0162354 A1* | 6/2010 | Zimmerman et al. | 726/2 |
| 2010/0205010 A1* | 8/2010 | Kosinski et al. | 705/3 |
| 2010/0257352 A1* | 10/2010 | Errico | 713/151 |
| 2011/0022412 A1* | 1/2011 | Jackson et al. | 705/3 |
| 2011/0154508 A1* | 6/2011 | Lorsch | 726/28 |
| 2011/0231194 A1* | 9/2011 | Lewis | 704/276 |

* cited by examiner

METHOD AND SYSTEM FOR COMMUNICATING INFORMATION

TECHNICAL FIELD

Disclosed are a method and system for communicating information from an information provider to a recipient. More particularly, the method and system are for communicating medical information from a medical information provider, such as a physician, to a patient.

BACKGROUND

Patients visit medical providers, such as physicians, to seek advice on a wide variety of medical conditions. During an office visit, the patient typically communicates a particular ailment or symptoms to the physician and the physician conducts an examination of the patient. Based on the office visit and examination, the physician may order further laboratory tests and/or other diagnostic procedures on the patient to confirm or rule-out a particular medical condition.

It generally takes from hours to several days before the results of laboratory tests and diagnostic procedures become available to the medical provider. Once the test results become available, the physician must notify the patient of the results of the laboratory tests and/or diagnostic procedures. The test results may indicate a normal medical condition for which further medical consultation or treatment is not required. For example, the test results that the medical provider must communicate to patients may merely comprise simple information such as, for example, "your blood test is normal," "your cholesterol is within normal limits," "your x-ray or MRI is negative," and like results. In other instances, however, the test results may indicate a more serious condition that requires additional testing or immediate medical attention. In fact, the test results may expose a life threatening medical condition which requires immediate medical treatment.

It is estimated that between 44,000 and 98,000 patients die every year in the United States of America from medical errors. While the vast majority of the deaths from medical errors result from mistakes in treatment or diagnosis, about 2 to 3 percent can be attributed to errors in communicating medical information from the medical provider to the patient. (*A String of Mistakes: The Importance of Cascade Analysis in Describing, Counting and Preventing Medical Errors*, Woolf, et al, August, 2004).

Physicians often have a difficult time contacting patients with results of medical tests. The difficulties can be attributed to several factors. First, the patient may not be available at the time the physician or physician's staff attempts to contact the patient by telephone. In addition, the physician must comply with medical privacy laws, thereby preventing the physician from leaving medical information or test results with third parties or on telephone answering machines. Furthermore, if a message to contact the physician is left on an answering machine or with a third party, the patient may have difficulty in contacting a medical provider by telephone or simply forget to call the physician back. Certain studies indicate that is takes about 4 telephone calls per test result to contact the patient. Taking this average, if a particular physician orders 2500 tests per year, it would take 10,000 telephone calls per year to communicate the tests results to the patients. Thus, physicians and their office staff waste valuable time and resources with repeated attempts to contact patients to communicate tests results and other medical information.

It is also necessary for physicians and other medical providers to confirm that patients actually receive the medical information. As mentioned above, the medical information could inform a patient of a life threatening condition. If the medical provider does not provide the information in a timely manner, the medical provider could be exposed to liability in failing to inform a patient of a medical condition.

Accordingly, it is desirable to provide a secure and private method and system for providing information from an information provider to a recipient, without having to attempt to contact recipient numerous times. Such a method and system finds useful application in the communication of medical information from medical providers to patients, thereby avoiding having to attempt to contact patients numerous times. Such a method and system would minimize wasted time and resources of medical providers, would increase patient safety, and would reduce medical malpractice liability risk for medical providers.

SUMMARY

A method for communicating information from an information provider to a recipient is provided, the method comprising providing a destination mailbox, generating a voice message with a computer software application, and delivering said voice message to said destination voice mailbox via a global computer network.

A method for communicating medical information from a medical provider to a patient is also provided, the method comprising providing a destination mailbox, generating a voice message containing medical information with a computer software application, and delivering said voice message to a destination mailbox via a global computer network.

Further provided is a method for communicating medical information from a medical provider to a patient, the method comprising providing a secure destination mailbox accessible by said patient, generating a voice message containing medical information with computer software via a global computer network browser, and delivering said message to said secure destination mailbox.

A system for generating and delivering a voice message containing medical information is provided, the system comprising a processor, memory coupled to said processor, computer application software stored in said memory, wherein said computer application program can receive an input voice message and instruct said processor to generate a voice file containing said voice message containing medical information and to deliver the voice file containing the voice message to a destination voice mailbox located on secure database server remotely accessible by said recipient.

DETAILED DESCRIPTION

Figure 1:
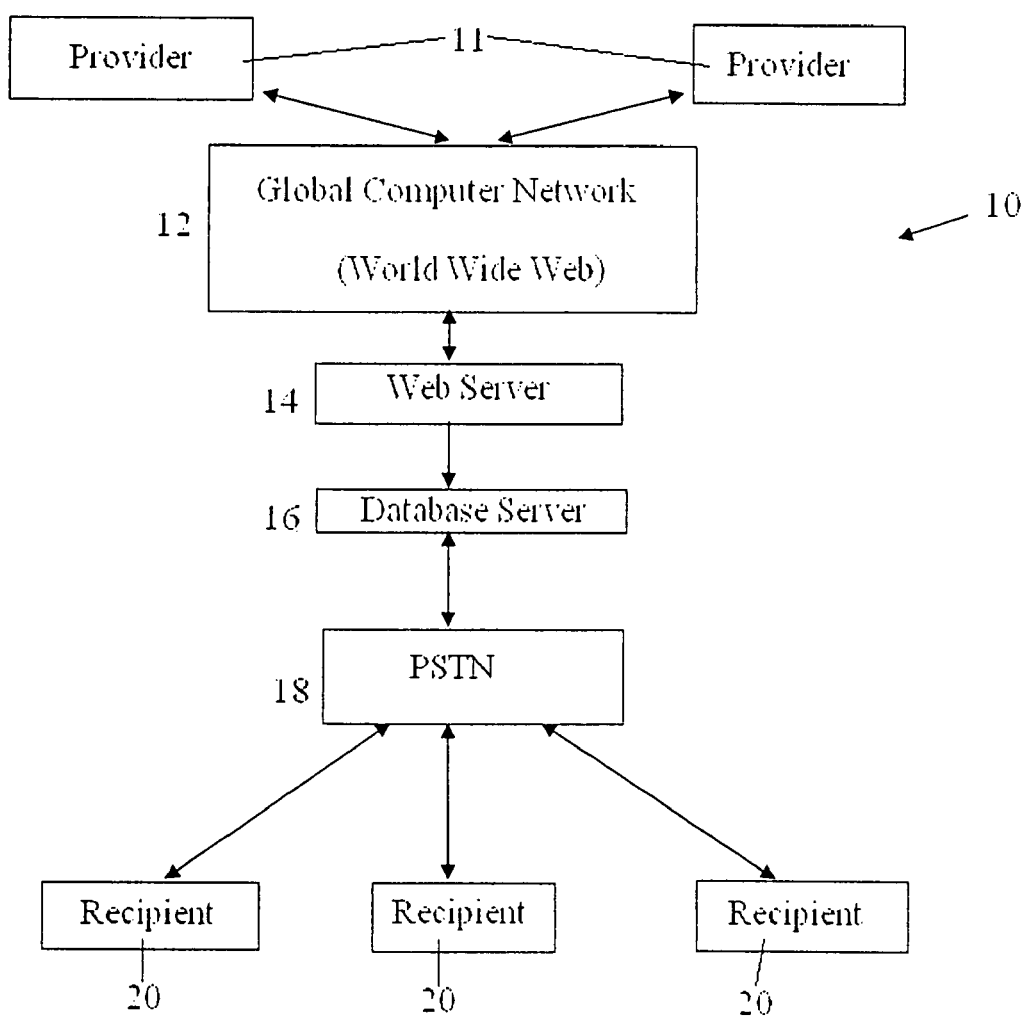
FIG. 1 is a flow chart of method of communicating information between an information provider and recipient.

A method for generating a voice message containing medical information is provided. The voice message containing medical information is generated by a medical provider and is delivered to a destination voice mailbox. The voice mailbox is accessible by a patient to enable the patient to retrieve the voice message containing the medical information.

According other embodiments, the method for providing a voice message containing medical information comprises providing a destination voice mailbox and generating a voice message containing medical information in the destination voice mailbox accessible by a patient. A message that is accessible only by the medical provider is generated to alert the medical provider the patient has retrieved the voice message from the mailbox.

According further embodiments, a method for providing a voice message containing medical information comprises providing a destination voice mailbox and generating a voice message containing medical information in the destination voice mailbox accessible by a patient. A message that is accessible only by the medical provider is generated to alert the medical provider that the patient has not retrieved the voice message from the mailbox.

According to further embodiments, a method for providing a voice message containing medical information comprises providing a destination voice mailbox and generating a voice message containing medical information in the destination voice mailbox accessible by a patient. A message that is accessible only by the medical provider is generated to alert the medical provider that the patient has retrieved the voice message and has complied with a requirement communicated to said patient in said voice message.

According to yet further embodiments, a method for providing a voice message containing medical information comprises providing a destination voice mailbox and generating a voice message containing medical information in the destination voice mailbox accessible by a patient. A message that is accessible only by the medical provider is generated to alert the medical provider that the patient has not complied with a requirement communicated to said patient in said voice message.

According to yet further embodiments, a method for providing a voice message containing medical information comprises providing a destination voice mailbox and generating a voice message containing medical information in the destination voice mailbox accessible by a patient. A message, such as an electronic mail message sent to the patient's email address, and that is accessible by the patient is generated to alert the patient that the patient has a voice message containing medical information for retrieval in the destination voice mailbox.

According to yet further embodiments, a system for generating and delivering a voice message containing medical information is provided. The system comprises a processor, memory, and a user interface. A computer software program is stored in the memory, and the memory is coupled with the processor. The computer software program receives an input voice mail message from the information provider and generates a audio file containing the voice message containing medical information and to deliver the voice file containing the voice message to a destination voice mailbox.

The system may be divided into several sub-systems. By way of example, the method for generating a voice message containing medical information contains sub-systems such as generating a voice recording using a java applet, placing an outbound call to a patient notifying them of the existence of a retrievable message containing information, and receiving an inbound call from the patient attempting to retrieve the relevant message. These sub-systems communicate through executing software as a cohesive system to generate, store, retrieve, and relay the medical information to the patient.

The method includes generating a voice message containing information with computer software, and delivering said voice message to a secure destination mailbox via a global computer network. The voice message containing information may be generated by an information provider dictating a voice message containing medical information via a user interface that is in communication with the system 10. The dictated voice message is captured and electronically processed in an audio file by computer software that is executing on the processor and delivered to a temporary storage location, such as a global computer network server. The audio file containing the voice message is temporarily stored in memory located on a global computer network server. According to illustrative embodiments, the computer software that captures, processes and delivers the dictated voice message comprises an applet.

The audio file is delivered from the temporary storage location on the global computer network server to a destination mailbox located on the memory of a second server. For security purposes, the second server may not be accessible via the global computer network. In general, the second server comprises memory and a database application storage on the memory and therefore the second server maybe referred to as a "database server".

The system is capable of generating a number of different alerts to the information provider and the information recipient. For example, the system is capable of generating and delivering an alert to the information recipient that a retrievable message containing information has been delivered to a destination mailbox. Furthermore, the system is capable of generating different alerts that are retrievable by the information provider. For instance, the system is capable of generating an alert retrievable by the information provider notifying the information provider that the recipient has not retrieved the message from the destination mailbox. Additionally, the system is capable of generating an alert that is retrievable by the information provider notifying the information provider that the recipient has retrieved the message from the destination mailbox. The message may contain information that the recipient must take action on, and it is important that the information provider be made aware whether or not the information recipient has or has not acted on the message. Thus, the system is also capable of generating an alert to the information provider that the recipient has not complied with a requirement communicated to the recipient in the message.

In addition to send an alert to the recipient via the telephone, the system is also able to generate and deliver an electronic text message to the recipient alerting the recipient that a message has been delivered to the mailbox for retrieval. This additional alert may be a text message comprising an electronic mail message delivered to a destination electronic mail address of and recipient, and which can be retrieved by any means known.

According to certain embodiments, the system generates an outbound telephone call to the recipient to notify the recipient of the existence of a retrievable message. The method includes scanning the database server for the presence of messages that have been stored in the database server memory and for which an alert must be delivered to the recipient. Once the database server has been scanned and a message has been detected, the database server communicates with a media convergence server and electronically delivers the information to the media convergence server required to send the alert to the recipient. The media convergence server processes the information that it has received from the database server into a form which can be executed by a call manager server, and then delivers the processed information to the call manager server. The call manager server receives the information from the media convergence server and places a call to the recipient via the public switch telephone network, based on the information provided by said media convergence server.

After a telephone call has been placed to the recipient by the system, the system is capable of keeping track of the results of the telephone call. According to certain embodiments, the call manager server delivers a message to the database server that a call has been placed by the call manager server to the recipient. Computer software stored on the media convergence server and communicating with the database server logs the information relating to the results of the telephone call that was made to the recipient in the memory of the database server.

The method and system are capable of processing inbound telephone calls from a patient attempting to retrieve a stored message. The recipient is provided with remote access to the destination mailbox to permit retrieval of delivered messages that have been generated by the information provider. Access to the destination mailbox generally comprises providing the recipient with a telephone number, mailbox number, and mailbox PIN. With this information, the recipient is able to remotely and securely access a message that was generated specifically for the recipient associated with the mailbox number and mailbox PIN, and stored in the destination mailbox located on the database server via a telephony system.

The recipient places a telephone call to the telephone number provided by the information provider. The inbound telephone call placed by the recipient is received by the system via a gateway. The gateway delivers the inbound telephone call to a call manager server. Upon receipt of the inbound call, the call manager server communicates with the media convergence server via a computer telephony interface. The media convergence server communicates with the database server to locate stored messages associated with the mailbox number and mailbox PIN entered by the recipient during the inbound telephone call, and permits retrieval of the stored message by the receipt. The system prompts the recipient to listen to the message. Once the recipient listens to the message, the inbound call may end FIG. 1 shows an illustrative flow chart for the communication pattern of the message system 10. An information provider 11, such as a physician, generates a message which is transmitted through a worldwide network of computers 12. The information provider uses a computing device, such as a personal computer, desktop computer, laptop computer, hand held computer, or the like to connect a worldwide network of computers. The information provider uses a browser interface program on the computing device to communicate with a particular website on the worldwide network of computers that permits the information provider access to computer software for processing voice messages.

The physician dictates the voice message into a sound recording device that is interfaced with the physician's computing device. Any sound recording device capable of communicating with modern personal computers may be used. Without limitation, suitable sound recording devices include USB microphones, standard microphones wired into the computer's sound card, and the like. According to certain embodiments, the sound recording device comprises a USB microphone. A suitable USB microphone may comprise those that are commercially available from Logitech.

Simultaneously executing with the browser interface program is computer software for recording, processing and uploading the dictated voice message. According to certain embodiments, the computer software that is simultaneously executing with the browser interface program is a Java applet program. Java technology is both a programming language and a platform. In the first sense, Java is a programming language expressly designed for use in the distributed environment of the Internet. It is designed to have the "look and feel" of the C++ language, but it is generally simpler to use than C++ and enforces an object-oriented programming model.

A Java applet is a self contained program that operates in conjunction with other programs. Java applets can be downloaded and executed by a Web browser capable of interpreting Java, such as Microsoft Internet Explorer or Netscape Navigator. Java applets are frequently used to add multimedia effects and interactivity to Web pages, such as video displays, animations, calculators, real-time clocks, and interactive games. Java can be used to create complete applications that may run on a single computer or be distributed among servers and clients in a network. According to the present method and system, the Java technology is used to create a small application module or applet for use as part of an internet web page. The use of an applet makes it possible for a web page user, such as an information provider, to use the internet web page to carry out certain desired functions.

Prior to the physician recording the message, the Java applet is downloaded dynamically from the web server 14. Accordingly, the Java applet and internet browser are executed (i.e.—"run") on the physician's computer, and the applet digitally records the physician's voice message in the form of a digital audio file. The digital audio file is initially stored in RAM (random access memory), compressed to a smaller file size, and then transferred over the Internet to the web server 14. On the web server 14 side of the system, the web server contains a Java servlet, which communicates with the applet on the physician's computer. The applet records the physician's message and relays the message over the Internet to the servlet. The servlet transmits the voice recording to the storage database 16, where the recording is then stored for retrieval by a patient at a later date.

In an embodiment, the web server 14 is connected to the Internet via an Ethernet connection, such as, without limitation, three-megabit Ethernet connection. Once the physician's message has been catalogued and stored on the database server 16, the patient/consumer 20 can then use a standard push button telephone to call over the Public Switch Telephone Network (PSTN) 18 into the web server 14, where access and retrieval of the recipient's message can be gained. The public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes wireless mobile telephones as well as fixed telephones.

Figure 4:
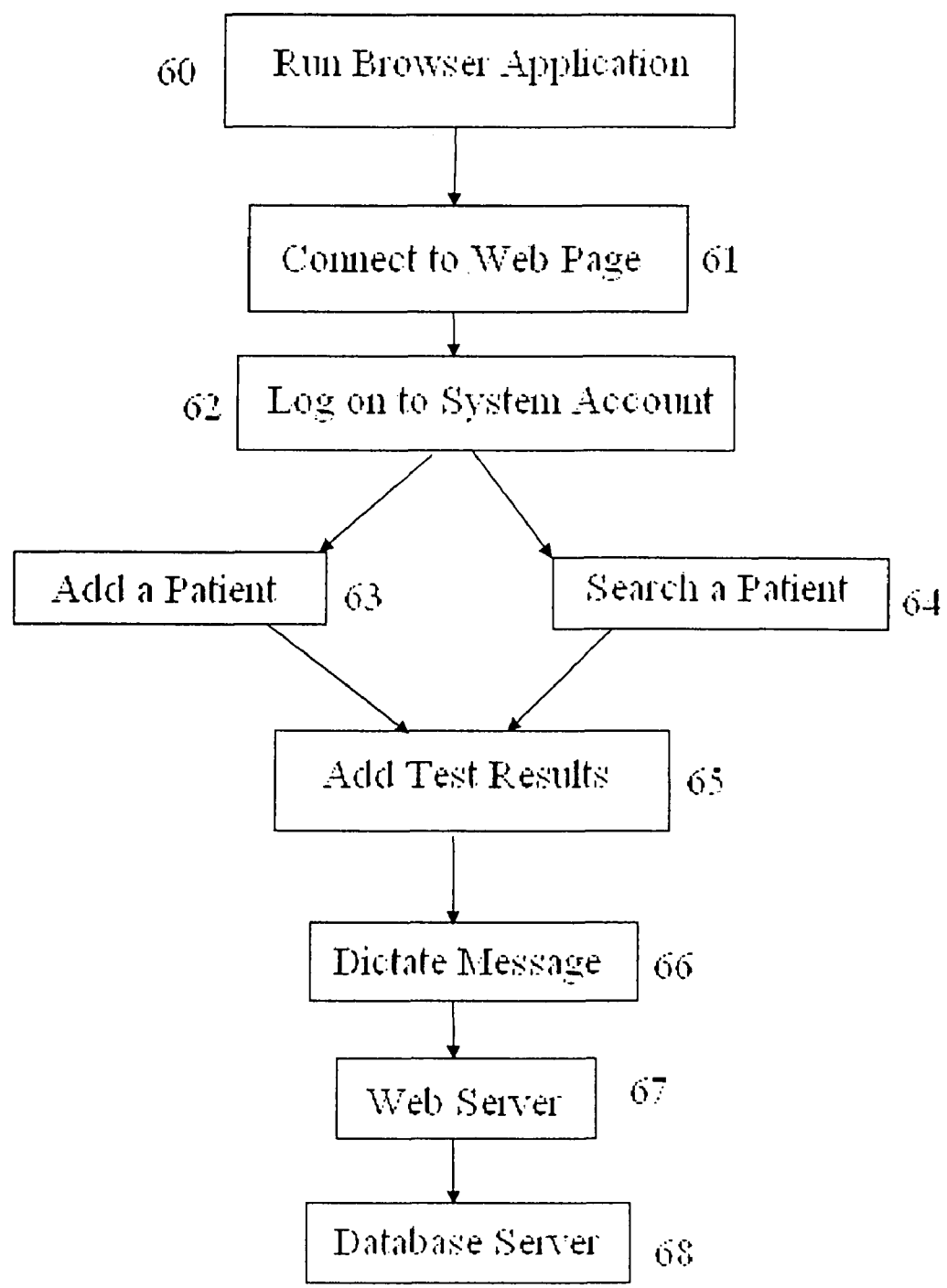
FIG. 4 is a flow chart illustrating the component communication and the available lines of communication between components of the system for inbound access of the message by the recipient.

FIG. 4 illustrates a flow chart for the generation and storage of a voice message containing information in accordance with the method and system. To begin the generation of a voice message containing information, an information provider, such as a physician or the physician's staff, utilizes a computing device to run 60 a global computer network browser application. Using the browser application, the information provider connects to a particular web page 61 that provides secure access to the system. Once the computer device is connected to the particular web page via the browser application, the information provider logs 62 onto the information provider account using a user name and password. Once logged onto the system, the information provider can select from any number of operations to carried out, which can be visualized by the interface display (i.e.—computer monitor). For example, the information provider by add a new patient 63 to the system. The information provider may also search 64 for a particular patient from a database of previously entered patients. Once a new patient is added or the desired patient is located, the information provider dictates 66 a voice message utilizing a suitable sound recording device that is interfaced with the computer's processor. Computer software executing on the computing device via the browser application records the dictated voice message, processes the message and delivers 67 the message to a web server. The web server delivers 68 the message to a database server where it is stored.

Figure 2:
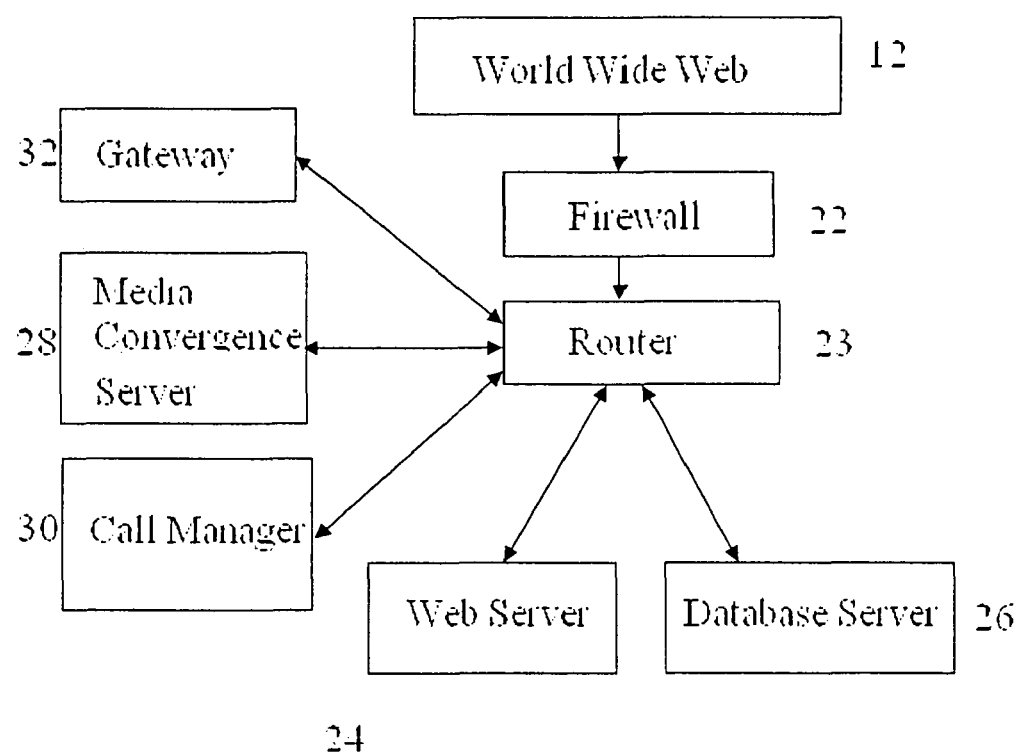
FIG. 2 is a flow chart illustrating the component communication and the available lines of communication between components of the system.
Figure 3:
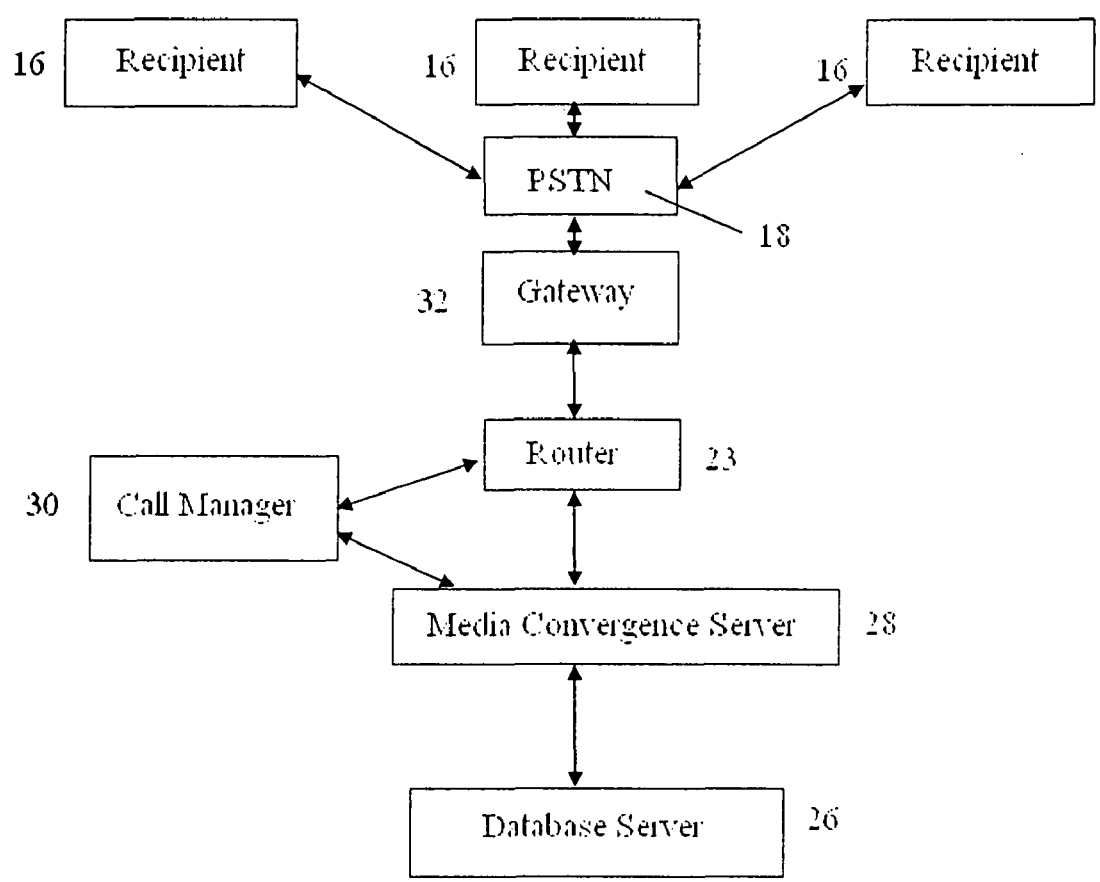
FIG. 3 is a flow chart of the method of the information recipient accessing a stored message on the system.

FIG. 2 illustrates the component communication flow chart and the available lines of communication between each component. When the physician's office 10 records and transmits a message, it is relayed over the Internet 12, to the web server 14. Illustrated by FIG. 3, the physician's message enters the web server 14 by passing through a suitable firewall 22, such as, without limitation, a Linux-based 64-bit firewall. A firewall is a network security device which is configured to permit, deny or proxy data connections set and configured by the organization's security policy. Firewalls can either be hardware and/or software based. A firewall's basic task is to control traffic between computer networks with different zones of trust. Typical examples would be the Internet which is a zone with no trust, and an internal network or Local Area Network (LAN) which is a zone with high trust.

Once the recording has passed through the firewall 22, the physician's message may be relayed to a router 23. According to this embodiment, without limitation, the router 23 may comprise a Cisco Catalyst 3750G model router, or equivalent. Generally, the router is a specialized computer connected to more than one network or a multiplicity of computer components that allows it to move data from one network to another or one component to the other. The primary function of the router is to connect networks together and maintain certain kinds of broadcast traffic under control.

Because the data being transmitted is a physician's incoming message, the router 23 relays the recording to an Application and Internet Information Server (AII) 24. According to this embodiment, without limitation, the AII server 24 may be a Dell PowerEdge 1850 or an equivalent. The AII server 24 may not be involved in the outbound and inbound calling protocols performed by the rest of the system 10. The AII server's 24 responsibility includes communicating with and controlling the incoming Internet 12 traffic. The AII server 24 interprets the recording, assigns the proper security measures to the recording, and then sends the recording back through the router 23, and to the database server 26. Without limitation, a suitable database server 26 may comprise a Dell PowerEdge 2850 or equivalent. The database server 26 is responsible for storing new messages, cataloging the messages, and organizing the numerous static voice messages waiting to be retrieved. Once the physician's message has been stored on the database server 26, the patient is alerted to the existence of a stored message and is able to retrieve the message from the database server 26 without any additional involvement from the physician or their medical staff.

The message system 10 is capable of handling thousands of recordings, while also automatically queuing calls to be made, processing inbound calls from patients, and placing outbound telephone calls to alert patients that information is waiting to be retrieved on the system 10. The queue list is processed and updated by the database server 26. Once a recoding is at the top of the database queue of the system 10, it is ready to be processed and an outbound alert call is made to the corresponding patient. The database server 26 then sends a trigger to a Media Convergence Server (MCS) 28, which according this embodiment and without limitation, comprises a Cisco Internet Protocol Interactive Voice Response (IP-IVR), or equivalent. A trigger is a small packet of information transmitted to another component of the system 10, which acts as a catalyst to begin another function. The trigger causes the MCS 28 to retrieve the necessary information required to place an outbound call to the correct patient, such as phone number and related physician's name from the database server 26. This information is then sent to the MCS 28, wherein the MCS 28 possesses an embedded server that is not seen by the patient, physician, or even the network administrator. According to this embodiment it may be a Tomcat server, or equivalent. The Tomcat server is a Java-based Web Application container that was created to run servlet and JavaServer page web applications. According to this embodiment, the Tomcat server is responsible for assisting in making the outbound phone calls, delivering the automated messages during the outbound phone calls, and monitoring the outbound calls for voicemail pickup, no pickup, or a live pickup. If there is no pickup or a voicemail pickup, the Tomcat server sends a small information packet to the database server 26, instructing the database server 26 to modify the information regarding the patient message that was just called to include record of the missed call. The Tomcat server also acts as a transport mechanism between another cooperative server.

The Tomcat server assists with communication between the MCS 28 and the Call Manager (CM) server 30 that is dedicated to all inbound and outbound calls made to the system. Any suitable CM server may be utilized in accordance with the system and method. Without limitation, a suitable CM server comprises the Cisco Call Manager Media Convergence Server used, but equivalents can be substituted. The main purpose of the CM server 30 is to handle the incoming and outgoing calls of the system 10. Outbound call information is gained from the MCS 28, and the outbound call is then transmitted through the router 23, and dialed out by a PSTN Gateway 32. The gateway 32 handles the PSTN 18 communication between the system and the patient's phone line. Any suitable gateway way device may be used in connection with the system and method that permits the handling of both inbound and outbound call. Without limitation, a suitable gateway that may be used in connection with the system and method comprises Cisco 2801 PSTN gateway or equivalent.

After an unspecified number of unsuccessful attempts to reach a live person (the patient recipient), the CM server 30 will leave an alert on the patient's voice mail, and the time and date of that message is recorded on the database server 26. The result of the outbound call is logged by the database server 26 and is independent of whether the outbound call connects with or misses the patient. This ongoing record of the systems establishes a record for the physician to consult in the event that an issue regarding the receipt of the message ever arises. The system will never leave the physician's actual recording containing medical information in a voice mail message or an answering machine. Rather, the system's 10 outbound call to the patient will only communicate that the physician has left a message containing medical information which is available to the patient upon placing a phone call to the system 10.

Another component of the system is the inbound calling component. Each patient of the physician is provided information with the Patient Result Hotline number, the patient's personal voice mailbox number, and the patient's personal voice mailbox PIN number. This information enables the patient to clear all security checkpoints within the system 10, and retrieve their physician's recording. Additionally, the system 10 can email the patient with the necessary information to gain access to the message. Accordingly, as stated previously, the email will never contain the message itself, only that there is a message waiting. Without limitation, a suitable electronic text alert may include the following message: "Dear _____ (patient name), this is the _____ (name of medical office). We have left a message for you in your private voicemail box. Please call the toll free number on the patient results card. Thank you."

In another embodiment, the Patient Result Hotline number, the patient's personal voice mailbox number, and the patient's personal voice mailbox PIN number and how to navigate the message system is supplied by a physician to a patient on a written card or may be supplied by email from the system 10. For example, a patient may be provided with a telephone number or internet web address which would allow access to the message once it is ready for the patient.

As illustrated by FIG. 4, when an inbound call from a patient is made, it may come from the PSTN 18 which may be answered by the gateway 32. The patient's call comes in and may then be directed through the router 22 to the CM server 30. From the CM server 30, the MCS 28 is responsible for communication between the MCS 28 and the database server 26. Additionally, communication between the MCS 28 and the database server 26 may be enabled by computer software stored on either the MCS 28 or database server 26, which facilitate certain protocols between the two servers and which eliminate the threat of overloading the system 10 with processing too many recordings or incoming and outbound calls. The computer software also permits the use of a multiplicity of mail boxes within the database server 26 where messages can be stored, which is referred to as a message vault.

In contacting the message system, a patient places a call to the Patient Result Hotline number and the MCS 28 processes the incoming call to the Call Manager server 30. Additionally, the patient enters their personal voice mailbox number along with their personal voice mailbox PIN, which is cross referenced with information stored on the database server 26. If the patient's personal voice mailbox number is matched with the database entry, the patient is prompted to enter their personal voice mailbox PIN number, which is then verified by the database server 26 to the PIN within the database server 26. The database server 26 then transmits the information back to the Call Manager server 30, through the MCS 28, over the PSTN 18 to the patient. If the PIN is incorrect, or the personal voice mailbox number does not match any of the database server's 26 records, an error indicating that the personal voice mailbox number or mailbox PIN was incorrect will be recorded in the database server 26. An error message alert may be generated and a message sent requiring the patient to call the medical provider's office for assistance may be generated, and thereafter the system disconnects from the user, after these events have been recorded within the memory of the database server 26.

Assuming that the user has correctly inputted the telephone number and the personal voice mailbox number, the user is then asked to enter a PIN. As before, the system compares the user-inputted PIN with the security code associated with the personal voice mailbox number. According to certain embodiments, if a match does not occur after two attempts, a message for the user to call the medical provider's office message is generated, and the system disconnects after the event is recorded on the server.

The system allows for enhanced security in delivering sensitive medical information. Both the medical personal voice mailbox number and the personal voice mailbox PIN must be entered, before information may be accessed by a patient. Thus, a third-party may not access the information. Security from Internet based threats are also limited by a firewall 20. Additionally, the MCS 28, the Call Manager 30 and the database server 26 are initialized so that another layer of security is added. Access to the database server 26 and the memory of the database servers 26 containing secure messages is only gained through the MCS 28. This protects the database server 26 from any Internet based attacks due to the database server 26 not being directly accessible by the AII server 24. Thus, it will be unlikely that sensitive medical information will be inadvertently delivered to the wrong recipient or patient.

A determination is then made whether or not a voice message containing medical information is available or has not been received by the patient. If the message has been accessed or picked up, a message stating that the message has been obtained is generated by the Call Manager server 30. If there is no message, a message describing that no message is present and generated by the Call Manager server 30.

However, if the patient has cleared the security checkpoints, the information is retrieved by the MCS 28 from the database server 26. Once the message has been transmitted to the patient, the database entry for that patient is modified so that the entry indicates that a message was relayed in full at a specific date and time. This information is kept within the database server 26 for an indefinite amount of time, so that the date and time stamp can be recalled if an issue ever arises.

Figure 5:
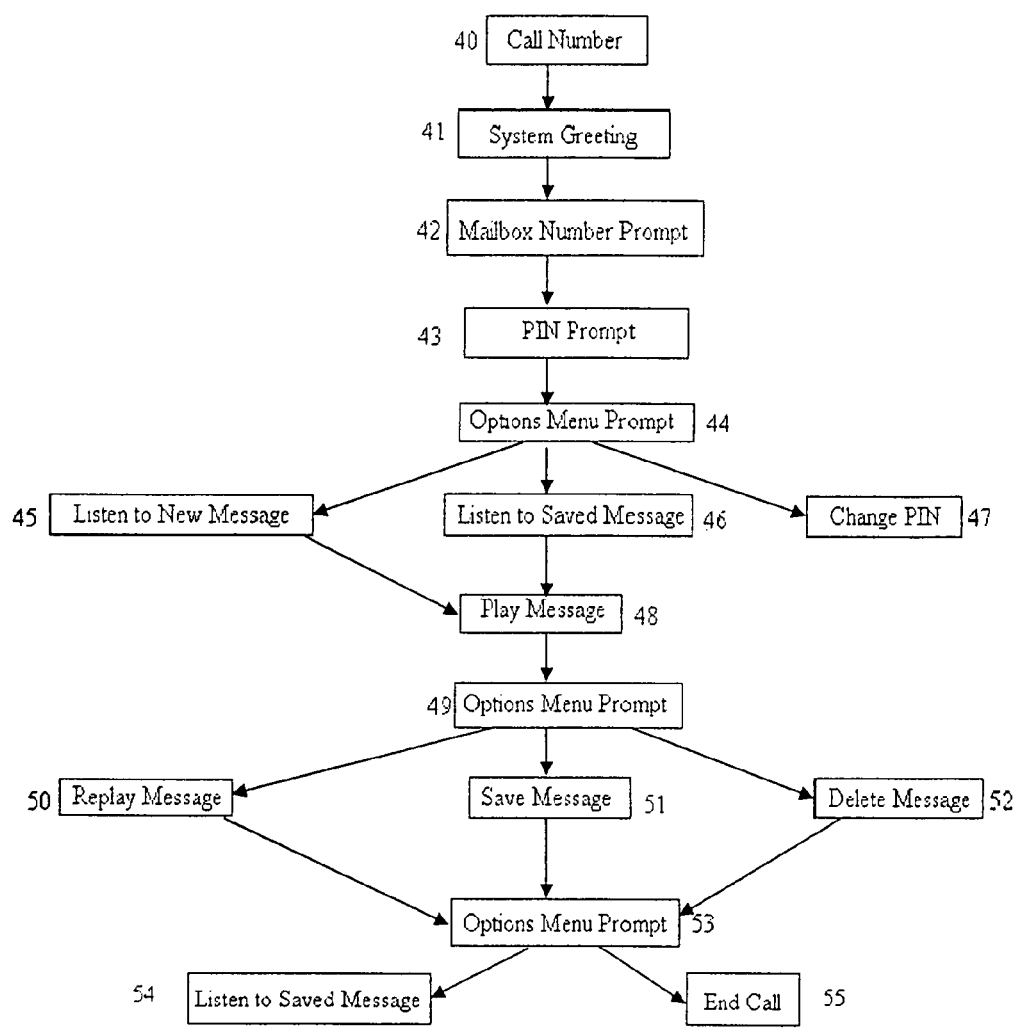
FIG. 5 is a flow chart of the method of the information recipient accessing a stored message on the system.

FIG. 5 illustrates a flow chart for the recipient's options for retrieving messages via an inbound call to the system. In step 40, the recipient, such as a patient, uses a telephone to call a number provided by the information provider. Once the call in answered by the system, a pre-recorded greeting 41 is communicated to the recipient. Following the greeting 41, the system prompts 42 the recipient to enter a mailbox number and a mailbox PIN 43. Once the mailbox number and PIN have been accepted by the system, the system prompts 44 the recipient to make a selection from a menu of options. As shown in FIG. 5, the options 44 may include listening to a new message 45, listening to a saved message 46, or change the recipient's PIN 47.

Assuming that the recipient selects listen to a new message 45 or listen to a saved message 46, the system will then play 48 the recorded message for the recipient. In the context of a medical information communication system, the message may include a wide variety of private message containing medical information, including for example, "your blood test is normal," "your blood test in abnormal, please call the office", "your cholesterol is within normal limits," :your culture is negative", "your culture is positive, please call the office", "your x-ray is negative", "your MRI is negative," "your pregnancy test is positive", "your pregnancy test is negative" and like messages.

After the playing 48 of the message has ended, the system will prompt 49 the recipient to make another choice. For example, the system will prompt 49 the recipient to replay the message 50, save the message 51 or delete the message 52. After the recipient makes a choice, the system will offer another menu of recipient choices and prompt 53 the recipient to make a choice. For example, these choices may include listening to a saved message 54 or ending the call 55. If the recipient selects choice 55, then the call is ended.

While the method and system have been described in a connection with a certain illustrative embodiment, namely, the use of the method and system to communicate private medical information from a medical provider to a patient, it should be noted that the method and system may be utilized in any situation in which an information provider communicates information to an information recipient. Without limitation, the method and system may be utilized to communication private information from attorney to a client, an accountant to a client, or any other relationship.

While the method and system have been described above in connection with certain illustrative embodiments, it is to be understood that other similar embodiments may be used or modifications and additions may be made to the described embodiments for performing the same function without deviating therefrom. Further, all embodiments disclosed are not necessarily in the alternative, as various embodiments may be combined to provide the desired characteristics. Variations can be made by one having ordinary skill in the art without departing from the spirit and scope of the invention. Therefore, the method and system should not be limited to any single embodiment, but rather construed in breadth and scope in accordance with the recitation of the attached claims.

We claim:

1. A method for communicating information from an information provider to a recipient comprising:
   providing a secure destination information mailbox;
   communicating via a global computer network browser application with a website on a global computer network that permits said information provider to securely access computer software for processing voice messages;
   inputting a voice message containing information into a computer processor via a user interface;
   capturing and electronically processing said inputted voice message containing information into an audio file with said computer software;
   delivering said audio file to said secure destination mailbox located on a second server via said global computer network;
   generating and delivering an alert to said recipient that said voice message containing information has been delivered to said secure destination mailbox; and
   providing said recipient with access to the secure destination mailbox to permit said recipient to remotely and securely access a delivered voice message.

2. The method of claim 1, wherein said inputting said message containing information comprises dictating a voice message containing medical information.

3. The method of claim 2, wherein said computer software comprises an applet.

4. The method of claim 3, wherein said processed message is delivered and temporarily stored in memory located on a global computer network server.

5. The method of claim 1, wherein said second server is not accessible via said global computer network.

6. The method of claim 5, wherein said second server comprises a database server.

7. The method of claim 6, further comprising scanning said database server for messages for which an alert must be delivered to said recipient.

8. The method of claim 7, wherein said database server communicates with a media convergence server and electronically delivers information to said media convergence server required to send said alert to said recipient.

9. The method of claim 8, wherein said media convergence server processes said information received from said database server into a form which can be executed by a call manager server, and then delivers said processed information to said call manager server.

10. The method of claim 9, wherein said call manager server places a call to said recipient via a public switched telephone network, based on the information provided by said media convergence server.

11. The method of claim 10, wherein said call manager server delivers a message to said database server that a call has been placed by said call manager to said recipient.

12. The method of claim 11, wherein computer software stored on said media convergence server logs information relating to the call in memory of the database server.

13. The method of claim 1, wherein providing access to said destination mailbox comprises providing said recipient with a telephone number, mailbox number, and mailbox PIN.

14. The method of claim 13, wherein said recipient remotely accesses said message stored in said destination mailbox via a telephony system.

15. The method of claim 14, wherein an inbound telephone call from said recipient is received by a gateway.

16. The method of claim 15, wherein said gateway delivers said call to a call manager server.

17. The method of claim 16, wherein said call manager server communicates with a media convergence server via a computer telephony interface.

18. The method of claim 17, wherein said media convergence server communicates with a database server, locates stored messages, and permits retrieval by said recipient.

19. The method of claim 18, further comprising generating an alert retrievable by said information provider notifying said information provider that said recipient has retrieved said message from said destination mailbox.

20. The method of claim 19, further comprising generating an alert to said information provider that said recipient has not complied with a requirement communicated to said recipient in said message.

21. The method of claim 1, further comprising generating an alert retrievable by said information provider notifying said information provider that said recipient has not retrieved said message from said destination mailbox.

22. The method of claim 1, further comprising generating and delivering a written message to said recipient alerting said recipient that a message has been delivered to said mailbox for retrieval.

23. The method of claim 22, wherein said written message comprises an electronic mail message delivered to a destination electronic mail address of said recipient.

24. A method for communicating medical information from a medical provider to a patient comprising:
   providing a secure destination information mailbox on a computer server;
   inputting a voice message containing medical information and electronically processing said voice message into an audio file with computer software executing on a computer processor securely accessed from a website via a browser application;
   securely delivering said processed voice message to a first global computer network server via a global computer network; and
   delivering said processed voice message from said global computer network server to said secure destination mailbox located on a second server that is not accessible via the global computer network.

* * * * *